United States Patent [19]
Roodvoets et al.

[11] 3,815,250
[45] *June 11, 1974

[54] TARGET SYSTEM FOR LAYING SEWER PIPES

[75] Inventors: Roger J. Roodvoets; James Stapert, Jr., both of Grand Rapids, Mich.

[73] Assignee: Laser Alignment, Inc., Grand Rapids, Mich.

[*] Notice: The portion of the term of this patent subsequent to Jan. 17, 1989, has been disclaimed.

[22] Filed: Sept. 30, 1971

[21] Appl. No.: 185,251

Related U.S. Application Data

[62] Division of Ser. No. 804,487, March 5, 1969, Pat. No. 3,634,941.

[52] U.S. Cl. .................................. 33/286, 33/1 H
[51] Int. Cl. ........................................... G01c 15/00
[58] Field of Search .................. 33/1 H, 1 R, 46 AT

[56] References Cited
UNITED STATES PATENTS

| | | | |
|---|---|---|---|
| 2,788,578 | 4/1957 | Digiacinto | 33/74 A |
| 3,255,530 | 6/1966 | Johnson | 33/74 A |
| 3,599,336 | 8/1971 | Walsh | 33/1 H |
| 3,634,941 | 1/1972 | Roodvoets et al. | 33/1 H |

Primary Examiner—William D. Martin, Jr.
Attorney, Agent, or Firm—Price, Heneveld, Huizenga & Cooper

[57] ABSTRACT

This disclosure relates to an adjustable target for use in aligning pipes with a laser beam or other similar collimated light beam which is projected axially with the pipe. The target has a base member, a level carried by the base member, an upright target carried by and vertically adjusted relative to the base. Extension means for the base member are also disclosed for extending the base laterally to permit the target to be employed in larger pipes.

6 Claims, 7 Drawing Figures

PATENTED JUN 11 1974 3,815,250

PATENTED JUN 11 1974 3,815,250

TARGET SYSTEM FOR LAYING SEWER PIPES

This is a division of Ser. No. 804,487 filed Mar. 5, 1969, of Roger J. Roodvoets and James Stapert, Jr., For Target System for Laying Sewer Pipes now U.S. Pat. No. 3,634,941.

This invention relates to targets for aligning pipes with a collimated light beam projected axially of the pipe. In one of its aspects the invention relates to a target for coupling with a pipe to align the pipes along a preselected path with the use of a collimated light beam, the target being adjustable to fit different size pipes.

In U.S. Pat. No. 3,116,557 there is disclosed and claimed a method for laying pipelines in which a collimated light beam is projected axially of the pipeline along a preselected axis and a target member is coupled to the last pipe. The end pipe is moved until the target is aligned with the collimated light beam and successive pipes are aligned in the pipeline by the same method.

Systems have been developed for laying different size pipes according to the method of U.S. Pat. No. 3,116,557. In each of these systems, a different target member must be used for each size pipe.

By various aspects of this invention one or more of the following, or other, objects can be obtained.

It is an object of this invention to provide a target for use in aligning a plurality of different size pipes in a method of laying a pipeline wherein a collimated light beam is projected axially of the pipeline.

It is a further object of this invention to provide an adjustable target which can be used in aligning large and small pipes in a pipeline with a laser beam projected axially of the pipeline.

Other aspects, objects, and the several advantages of this invention are apparent to one skilled in the art from a study of this disclosure, the drawings, and the appended claims.

According to the invention, there is provided an adjustable target for use in aligning pipes with a collimated light beam such as a laser beam which is projected axially with the pipe. The target comprises a base member, a level carried by the base member, an upright target supported by the base and being vertically adjustable therewith. The base contains extension means for laterally extending the width of the base so as to permit the target to be used in various size pipes.

The invention will now be described with reference to the accompanying drawings in which.

Figure 3:
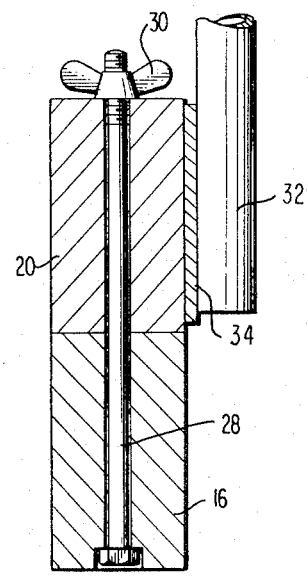
FIG. 3 is a sectional view taken along lines III—III of FIG. 2.

Referring now to the drawings, and to FIGS. 1–5 in particular, a base 12 has a target member 14 extending upwardly therefrom. The base is made from runners 16 having rounded ends 17 and fixed to a sub-base 18. The sub-base 18 is formed from a front panel member 20, a back panel member 22, cross members 24 secured by suitable fastening means to the front and back panel members. The cross members 24 have rounded bottom edges 26 at the ends thereof. Bolts 28 extend through the runner 16 in the front and back panel members, as illustrated in FIG. 3, to secure the base to the runner. Wing nuts 30 is fixed to bolts 28.

The target member 14 comprises tubes 32 which are affixed to a plate 34 which in turn is secured to the front panel member 20. A U-shaped member 36 has downwardly extending legs which are slidably engaged by the tubes 32. The legs of the U-shaped member 36 are secured in place by tightening screws 44. A translucent screen 38 with a target is secured to the U-shaped member through braces 40. Suitable fastening means such as clamps and screws secure the braces to the U-shaped member 36. The center of the target screen 38 is centered on sub-base 18 and on the runners 16. A collimated light beam, such as a laser beam, projected coaxially of the pipe is represented by 10.

Figure 5:
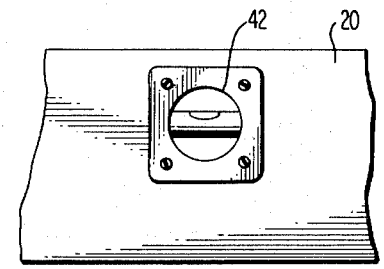
FIG. 5 is an enlarged front view of a portion of the device shown in FIG. 1.
Figure 2:
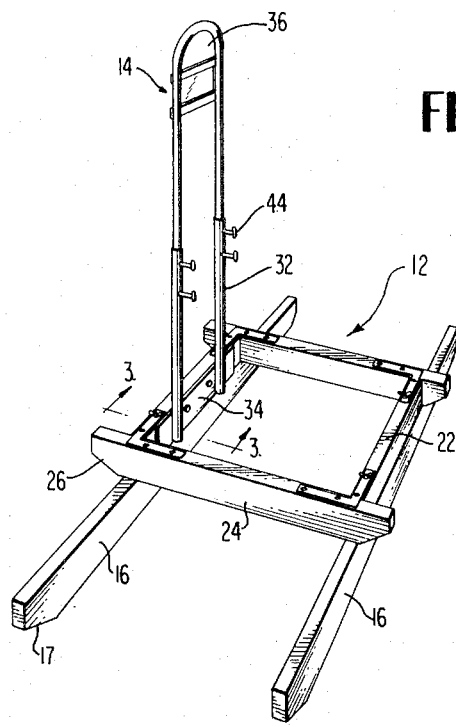
FIG. 2 is a side perspective view of the target system illustrated in FIG. 1.
Figure 4:
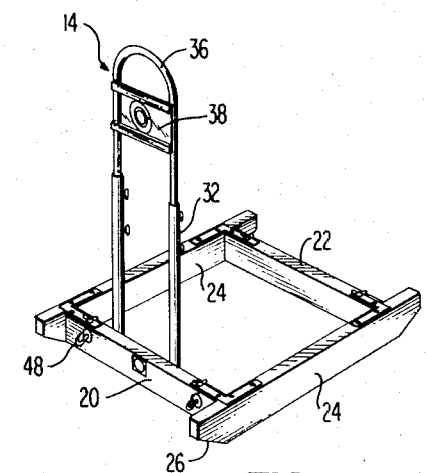
FIG. 4 is a perspective view of the target system of FIG. 1 without the extension members to illustrate how the device is used in a smaller pipeline.

As illustrated in FIG. 5, a bubble level 42 is fixed in the front panel member 20, the bubble being centered when the base is horizontal.

Figure 1:
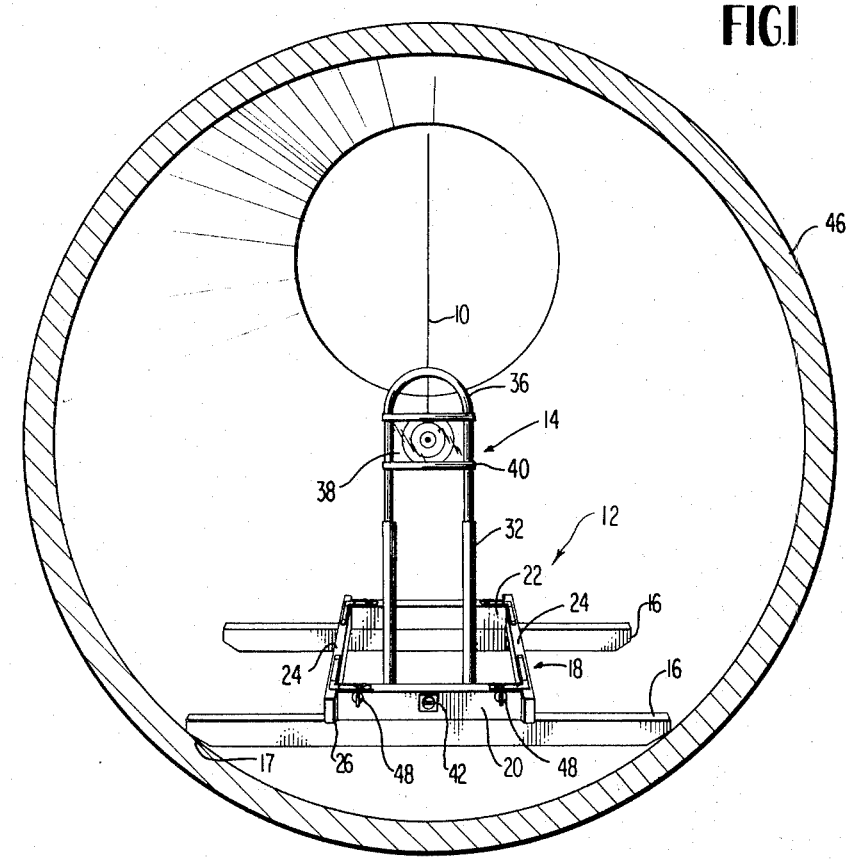
FIG. 1 is a front perspective view of a target system according to the invention as positioned in the end pipe of a pipeline.

In operation, the device is positioned within a pipeline as illustrated in FIG. 1. The base 12 is moved laterally within the pipeline until the bubble level shows that the base member is level. At that point, the center of the target on the translucent screen 38 will be exactly in the vertical center of the pipe. The inside diameter of the pipe is then measured. The target is then raised by lifting the U-shaped member 36 relative to the tubes 32 until the center of the target is exactly one-half the inner diameter of the pipe from the bottom point on the inner diameter of the pipe. At this point, the tightening screws 44 are tightened to fix the target securely in place. The base of the target can then be weighted to hold it in place when the pipe is moved. The pipe is then aligned by centering the prealigned light beam 10 on the target in accordance with the method set forth and claimed in U.S. Pat. No. 3,116,557. After the pipe has been aligned, it is fixed in place and additional pipes are laid by this same method. The target can be pulled from one pipe to the next by ropes (not shown) which can be attached to hooks 48. The target is then centered in the next pipe by adjusting the base until it is level.

Thus, when a pipeline is being laid according to the method of U.S. Pat. No. 3,116,557 after the first pipe has been properly aligned, the second pipe is positioned on the end of the first pipe and the base is pulled along to the end of the second pipe. As soon as the base is adjusted so that the bubble in the level 42 is centered, the center of the target will be in the center of the pipe. The end of the pipe is then positioned along the preselected path by adjusting the pipe end until the collimated light 10 is centered on the target.

When smaller pipelines are used, the wing nuts 30 are removed so that the runners 16 can be removed from the sub-base 18. The sub-base is then positioned within the pipe and the target is centered according to the above described method.

Figure 6:
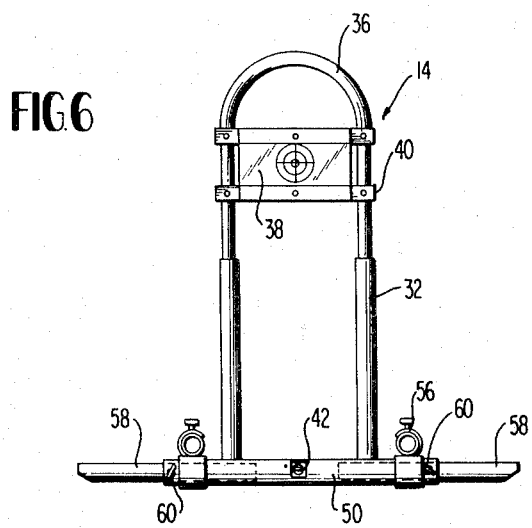
FIG. 6 is a front elevational view of a modified form of the invention.
Figure 7:
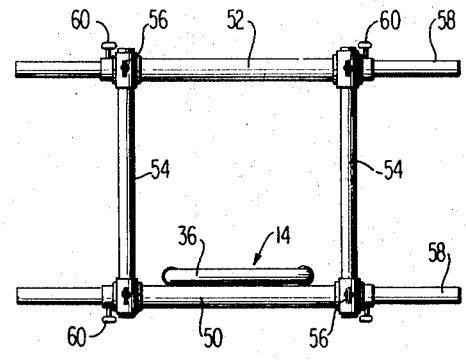
FIG. 7 is a plan view of the modified form illustrated in FIG. 6.

In the modified form of the invention illustrated in FIGS. 5 and 6, like numerals have been used to describe like parts. In this modification, the target member 14 is identical to that illustrated in FIGS. 1–4. The base is constructed from a front tubular member 50, a back tubular member 52, and cross braces 54 secured together through clamps 56. Extension bars 58 are slidably retained within the front and back tubular members by tightening screws 60. In this modified form, the base is adaptable to a plurality of different sized pipes by simply extending the extension bars 58 equally in lateral directions. The operation of the modified form is then identical with the form of the invention illustrated in FIGS. 1–5.

Reasonable variation and modification are possible within the scope of the foregoing disclosure and drawings without departing from the spirit of the invention.

The embodiments of the invention in which an exclusive property or privilege is claimed are defined as follows:

1. A target system for use in aligning pipes with a collimated light beam which is projected longitudinally through the inside of the pipe, said target system comprising in combination:
    a collimated light beam source; and
    a target which comprises a target screen having an alignment indicating means for intersecting said collimated light beam; support means for supporting said screen within said pipe, said support means having two spaced support surfaces located on a plane for simultaneously resting on the inner surface of a pipe so as to support said screen, said spacing being less than the diameter of the pipe in which the target is to be used, said support means supporting said target in such a manner that said target screen is located above said spaced support surfaces on a plane transverse to a longitudinal axis of said pipe; and level indicating means mounted on said support means between said surfaces such that said alignment indicating means of said target screen will be located on a predetermined vertical plane through said pipe when said level indicating means is at a level position, whereby said target will always be aligned in a predetermined positioned within said pipe when said level indicating means is at a level position.

2. The target system of claim 1 wherein said collimated light beam source is a laser beam source.

3. The target system of claim 1 wherein said target screen is a translucent screen.

4. A target system according to claim 1 which further comprises means for adjusting the spacing between said two support surfaces.

5. A target system according to claim 1 which further comprises means for adjusting the target screen toward or away from the plane on which said spaced surfaces are located.

6. The target system according to claim 5 wherein means are provided for adjusting the spacing between said two support surfaces.

* * * * *